United States Patent
Gu et al.

(10) Patent No.: US 8,396,114 B2
(45) Date of Patent: *Mar. 12, 2013

(54) MULTIPLE BIT RATE VIDEO ENCODING USING VARIABLE BIT RATE AND DYNAMIC RESOLUTION FOR ADAPTIVE VIDEO STREAMING

(75) Inventors: Chuang Gu, Bellevue, WA (US); Chun-Wei Chan, Redmond, WA (US); William Chen, Issaquah, WA (US); Stacey Spears, Sammamish, WA (US); Thomas W. Holcomb, Sammamish, WA (US); Chih-Lung Lin, Redmond, WA (US); Sanjeev Mehrotra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1026 days.

This patent is subject to a terminal disclaimer.

(21) Appl. No.: 12/362,420

(22) Filed: Jan. 29, 2009

(65) Prior Publication Data

US 2010/0189183 A1 Jul. 29, 2010

(51) Int. Cl.
*H04N 7/12* (2006.01)
*G06K 9/36* (2006.01)
*G06F 11/00* (2006.01)

(52) U.S. Cl. .................... 375/240.01; 382/232; 370/235
(58) Field of Classification Search .............. 375/240.01–240.29; 382/232; 370/235
See application file for complete search history.

(56) References Cited

U.S. PATENT DOCUMENTS

| | | | |
|---|---|---|---|
| 4,142,071 | A | 2/1979 | Croisier et al. |
| 4,216,354 | A | 8/1980 | Esteban et al. |
| 4,464,783 | A | 8/1984 | Beraud et al. |
| 5,243,420 | A | 9/1993 | Hibi |
| 5,381,143 | A | 1/1995 | Shimoyoshi et al. |
| 5,418,570 | A | 5/1995 | Ueno et al. |
| 5,436,665 | A | 7/1995 | Ueno et al. |
| 5,454,011 | A | 9/1995 | Shimoyoshi |
| 5,463,424 | A | 10/1995 | Dressler |
| 5,537,440 | A | 7/1996 | Eyuboglu et al. |

(Continued)

FOREIGN PATENT DOCUMENTS

| | | |
|---|---|---|
| EP | 0 909 094 | 4/1999 |
| EP | 1 195 992 | 4/2002 |

(Continued)

OTHER PUBLICATIONS

Gill, "Tips and Tricks for Encoding Long Format Content with Windows Media Encoder," <http://www.microsoft.com/windows/windowsmedia/howto/articles/enclfc.aspx>, Microsoft Windows Media, 12 pages, Aug. 2003 (accessed Jan. 2, 2009).

(Continued)

*Primary Examiner* — Gims Philippe
(74) *Attorney, Agent, or Firm* — Klarquist Sparkman, LLP

(57) ABSTRACT

A video encoding system encodes video streams for multiple bit rate video streaming using an approach that permits the encoded bit rate to vary subject to a peak bit rate and average bit rate constraints for higher quality streams, while a bottom bit rate stream is encoded to achieve a constant chunk rate. The video encoding system also dynamically decides an encoding resolution for segments of the multiple bit rate video streams that varies with video complexity so as to achieve a better visual experience for multiple bit rate streaming.

19 Claims, 6 Drawing Sheets

U.S. PATENT DOCUMENTS

| | | | |
|---|---|---|---|
| 5,541,852 A | 7/1996 | Eyuboglu et al. | |
| 5,544,266 A | 8/1996 | Koppelmans et al. | |
| 5,617,142 A | 4/1997 | Hamilton | |
| 5,623,424 A | 4/1997 | Azadegan et al. | |
| 5,659,660 A | 8/1997 | Plenge et al. | |
| 5,677,735 A | 10/1997 | Ueno et al. | |
| 5,835,495 A | 11/1998 | Ferriere | |
| 5,970,173 A | 10/1999 | Lee et al. | |
| 6,044,089 A | 3/2000 | Ferriere | |
| 6,084,909 A | 7/2000 | Chiang et al. | |
| 6,192,075 B1 | 2/2001 | Jeng | |
| 6,192,154 B1* | 2/2001 | Rajagopalan et al. | 382/232 |
| 6,249,288 B1 | 6/2001 | Campbell | |
| 6,259,741 B1 | 7/2001 | Chen et al. | |
| 6,278,691 B1 | 8/2001 | Ohyama et al. | |
| 6,370,502 B1 | 4/2002 | Wu et al. | |
| 6,393,059 B1 | 5/2002 | Sugiyama | |
| 6,404,814 B1 | 6/2002 | Apostolopoulos et al. | |
| 6,426,977 B1 | 7/2002 | Lee et al. | |
| 6,434,197 B1 | 8/2002 | Wang et al. | |
| 6,463,414 B1 | 10/2002 | Su et al. | |
| 6,466,623 B1 | 10/2002 | Youn et al. | |
| 6,496,216 B2 | 12/2002 | Feder | |
| 6,496,868 B2 | 12/2002 | Krueger et al. | |
| 6,504,494 B1 | 1/2003 | Dyas et al. | |
| 6,507,615 B1 | 1/2003 | Tsujii et al. | |
| 6,522,693 B1 | 2/2003 | Lu et al. | |
| 6,526,099 B1 | 2/2003 | Christopoulos et al. | |
| 6,647,061 B1 | 11/2003 | Panusopone et al. | |
| 6,650,705 B1 | 11/2003 | Vetro et al. | |
| 6,678,654 B2 | 1/2004 | Zinser, Jr. et al. | |
| 6,728,317 B1 | 4/2004 | Demos | |
| 6,757,648 B2 | 6/2004 | Chen et al. | |
| 6,925,501 B2 | 8/2005 | Wang et al. | |
| 6,931,064 B2 | 8/2005 | Mori et al. | |
| 6,934,334 B2 | 8/2005 | Yamaguchi et al. | |
| 6,937,653 B2 | 8/2005 | Song et al. | |
| 6,944,224 B2 | 9/2005 | Zhao et al. | |
| 6,961,377 B2 | 11/2005 | Kingsley | |
| 6,963,347 B1 | 11/2005 | Selvaggi et al. | |
| 7,027,982 B2 | 4/2006 | Chen et al. | |
| 7,039,116 B1 | 5/2006 | Zhang et al. | |
| 7,058,127 B2 | 6/2006 | Lu et al. | |
| 7,068,718 B2 | 6/2006 | Kim et al. | |
| 7,085,322 B2 | 8/2006 | Ngai et al. | |
| 7,116,714 B2 | 10/2006 | Hannuksela | |
| 7,142,601 B2 | 11/2006 | Kong et al. | |
| 7,292,634 B2 | 11/2007 | Yamamoto et al. | |
| 7,295,612 B2 | 11/2007 | Haskell | |
| 7,319,720 B2 | 1/2008 | Abrams, Jr. | |
| 7,336,720 B2 | 2/2008 | Martemyanov et al. | |
| 7,343,291 B2 | 3/2008 | Thumpudi | |
| 7,352,808 B2* | 4/2008 | Ratakonda et al. | 375/240.01 |
| 7,643,422 B1* | 1/2010 | Covell et al. | 370/235 |
| 7,694,075 B1 | 4/2010 | Feekes, Jr. | |
| 7,885,341 B2 | 2/2011 | Chen et al. | |
| 7,936,820 B2 | 5/2011 | Watanabe et al. | |
| 8,130,828 B2 | 3/2012 | Hsu et al. | |
| 2002/0036707 A1 | 3/2002 | Gu | |
| 2002/0080877 A1 | 6/2002 | Lu et al. | |
| 2002/0090027 A1* | 7/2002 | Karczewicz et al. | 375/240.01 |
| 2002/0131492 A1 | 9/2002 | Yokoyama | |
| 2002/0136298 A1 | 9/2002 | Anantharamu | |
| 2002/0172154 A1 | 11/2002 | Uchida et al. | |
| 2003/0185298 A1 | 10/2003 | Alvarez et al. | |
| 2003/0206597 A1 | 11/2003 | Kolarov et al. | |
| 2003/0227974 A1 | 12/2003 | Nakamura et al. | |
| 2004/0117427 A1 | 6/2004 | Allen et al. | |
| 2004/0125877 A1 | 7/2004 | Chang | |
| 2004/0136457 A1 | 7/2004 | Funnell et al. | |
| 2004/0165667 A1 | 8/2004 | Lennon et al. | |
| 2004/0264489 A1 | 12/2004 | Klemets et al. | |
| 2005/0041740 A1 | 2/2005 | Sekiguchi | |
| 2005/0053157 A1 | 3/2005 | Lillevold | |
| 2005/0075869 A1 | 4/2005 | Gersho et al. | |
| 2005/0084007 A1 | 4/2005 | Lightstone et al. | |
| 2005/0165611 A1 | 7/2005 | Mehrotra et al. | |
| 2005/0175091 A1 | 8/2005 | Puri et al. | |
| 2005/0180511 A1 | 8/2005 | Arafune et al. | |
| 2005/0207497 A1 | 9/2005 | Rovati et al. | |
| 2005/0228854 A1 | 10/2005 | Steinheider et al. | |
| 2005/0232497 A1 | 10/2005 | Yogeshwar et al. | |
| 2006/0002479 A1 | 1/2006 | Fernandes | |
| 2006/0114995 A1 | 6/2006 | Robey et al. | |
| 2006/0120610 A1 | 6/2006 | Kong et al. | |
| 2006/0126726 A1 | 6/2006 | Lin et al. | |
| 2006/0126744 A1 | 6/2006 | Peng et al. | |
| 2006/0159169 A1* | 7/2006 | Hui et al. | 375/240.03 |
| 2006/0215754 A1 | 9/2006 | Buxton et al. | |
| 2006/0222078 A1 | 10/2006 | Raveendran | |
| 2006/0239343 A1 | 10/2006 | Mohsenian | |
| 2006/0245491 A1 | 11/2006 | Jam et al. | |
| 2006/0248516 A1 | 11/2006 | Gordon | |
| 2007/0053444 A1 | 3/2007 | Shibata et al. | |
| 2007/0058718 A1 | 3/2007 | Shen et al. | |
| 2007/0058729 A1 | 3/2007 | Yoshinari | |
| 2007/0071105 A1 | 3/2007 | Tian et al. | |
| 2007/0140352 A1 | 6/2007 | Bhaskaran et al. | |
| 2007/0153906 A1 | 7/2007 | Petrescu et al. | |
| 2007/0160128 A1 | 7/2007 | Tian et al. | |
| 2007/0223564 A1 | 9/2007 | Bruls et al. | |
| 2007/0280349 A1 | 12/2007 | Prieto et al. | |
| 2008/0046939 A1 | 2/2008 | Lu et al. | |
| 2008/0137736 A1 | 6/2008 | Richardson et al. | |
| 2008/0144723 A1 | 6/2008 | Chen et al. | |
| 2008/0151101 A1 | 6/2008 | Tian et al. | |
| 2008/0187046 A1 | 8/2008 | Joch | |
| 2008/0259921 A1 | 10/2008 | Nadarajah | |
| 2009/0003452 A1 | 1/2009 | Au et al. | |
| 2009/0012982 A1 | 1/2009 | Merchia et al. | |
| 2009/0110060 A1 | 4/2009 | Cortes et al. | |
| 2009/0147859 A1 | 6/2009 | McGowan et al. | |
| 2009/0176454 A1 | 7/2009 | Chen et al. | |
| 2009/0219993 A1 | 9/2009 | Bronstein et al. | |
| 2009/0244633 A1 | 10/2009 | Johnston | |
| 2009/0279605 A1 | 11/2009 | Holcomb et al. | |
| 2009/0282162 A1 | 11/2009 | Mehrotra et al. | |
| 2010/0086048 A1 | 4/2010 | Ishtiaq et al. | |
| 2010/0091888 A1 | 4/2010 | Nemiroff | |
| 2010/0189179 A1 | 7/2010 | Gu et al. | |
| 2010/0272171 A1 | 10/2010 | Xu | |
| 2010/0316126 A1 | 12/2010 | Chen et al. | |
| 2011/0188577 A1 | 8/2011 | Kishore et al. | |
| 2011/0305273 A1 | 12/2011 | He et al. | |
| 2012/0056981 A1 | 3/2012 | Tian et al. | |

FOREIGN PATENT DOCUMENTS

| | | |
|---|---|---|
| JP | 03032088 | 2/2000 |
| JP | 2002-152752 | 5/2002 |
| JP | 9214965 | 6/2002 |
| JP | 2005-252555 | 9/2005 |
| JP | 2007-036666 | 2/2007 |
| KR | 10-2005-0089720 | 9/2005 |
| KR | 10-2008-0102141 | 11/2008 |
| WO | WO 01/95633 | 12/2001 |
| WO | WO 2004/004359 | 1/2004 |
| WO | WO 2006/096612 | 9/2006 |
| WO | WO 2006/134110 | 12/2006 |
| WO | WO 2010/088030 | 8/2010 |

OTHER PUBLICATIONS

Huang et al., "Optimal Control of Multiple Bit Rates for Streaming Media," <http://nisl.wayne.edu/Papers/Tech/HuangCK04c.pdf>, 4 pages.

Waggoner, "In Depth Microsoft Silverlight," <http://conferences.infotoday.com/documents/45/SM3_Waggoner.pdf>, Microsoft Silverlight, 93 pages, 2007.

Chang et al., "Real-Time Content-Based Adaptive Streaming of Sports Videos," <http://www.ctr.columbia.edu/papers_advent/01/sport_TR01.pdf>, IEEE CVPR CBAIVL Workshop, 8 pages, Jul. 2001.

RealNetworks, Inc., "Chapter 5: Producing Video," <http://service.real.com/help/library/guides/RealProducer10/htmfiles/video.htm#113899>, 22 pages, 2004 (accessed Jan. 2, 2009).

Microsoft Windows Media, "Windows Media and Web Distribution for Broadcasters," <http://www.microsoft.com/windows/ windowsmedia/forpros/content_provider/broadcast/default.aspx>, 4 pages, 2009 (accessed Jan. 2, 2009).

U.S. Appl. No. 60/341,674, fileded Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

U.S. Appl. No. 60/501,133, filed Sep. 7, 2003, Holcomb et al.

Akramullah et al., "Parallelization of MPEG-2 Video Encoder for Parallel and Distributed Computing Systems," *IEEE*, pp. 834-837 (Aug. 1995).

Asbun et al., "Very Low Bit Rate Wavelet-Based Scalable Video Compression," *Proc. Int'l Conf. on Image Processing*, vol. 3, pp. 948-952 (Oct. 1998).

Assuncao et al., "A Frequency-Domain Video Transcoder for Dynamic Bit-Rate Reduction of MPEG-2 Bit Streams," IEEE Transactions on Circuits and Systems for Video Technology, vol. 8, No. 8, pp. 953-967 (Dec. 1998).

Assuncao et al., "Buffer Analysis and Control in CBR Video Transcoding," *IEEE Transactions on Circuits and Systems for Video Technology*, vol. 10, No. 1, pp. 83-92 (Feb. 2000).

Assuncao et al., "Transcoding of Single-Layer MPEG Video Into Lower Rates," *IEE Proc.—Vis. Image Signal Process.*, vol. 144, No. 6, pp. 377-383 (Dec. 1997).

ATI Technologies, Inc., "Introduction to H.264," 6 pp. (month unknown, 2005).

Braun et al., "Motion-Compensating Real-Time Format Converter for Video on Multimedia Displays," *Proceedings IEEE 4th International Conference on Image Processing (ICIP-97)*, vol. I, pp. 125-128 (Oct. 1997).

Brightwell et al., "Flexible Switching and Editing of MPEG-2 Video Bitstreams," *IBC-97*, 11 pp. (Sep. 1997).

Chen et al., "Implementation of H.264 Encoder and Decoder on Personal Computers," *Journal of Visual Comm. and Image Representation*, 19 pp. (Apr. 2006).

Chen, "Synchronization and Control of Multi-threads for MPEG-4 Video Decoder," *IEEE 1999 Int'l Conf. on Consumer Electronics*, pp. 298-299 (Jun. 1999).

Crooks, "Analysis of MPEG Encoding Techniques on Picture Quality," *Tektronix Application Note*, 11 pp. (Jun. 1998).

Dawson, "Coding for Multiple Cores on Xbox 360 and Microsoft Windows," 8 pp. (Aug. 2006) [Downloaded from the Internet on Jan. 22, 2007].

Dipert, "Image Compression Article Addendum," *EDN Magazine*, 8 pp. (Jun. 18, 1998).

Duffy, "CLR Inside Out: Using Concurrency for Scalability," MSDN Magazine, 11 pp. (Sep. 2006) [Downloaded from the Internet on Jan. 22, 2007].

Flordal et al., "Accelerating CABAC Encoding for Multi-standard Media with Configurability," IEEE Xplore, 8 pp. (Apr. 2006).

Fogg, "Question That Should Be Frequently Asked About MPEG," Version 3.8, 46 pp. (Apr. 1996).

FOLDOC.ORG, "priority scheduling," 1 p. (No date) [Downloaded from the Internet on Jan. 26, 2007].

FOLDOC.ORG, "multitasking," 1 p. (Document dated Apr. 24, 1998) [Downloaded from the Internet on Jan. 26, 2007].

Gerber et al., "Optimizing Video Encoding using Threads and Parallelism: Part 1—Threading a video codec," 3 pp., downloaded from Embedded.com, (Dec. 2009).

Gibson et al., *Digital Compression for Multimedia*, "Chapter 4: Quantization," Morgan Kaufman Publishers, Inc., pp. 113-138 (Jan. 1998).

Gibson et al., *Digital Compression for Multimedia*, "Chapter 7: Frequency Domain Coding," Morgan Kaufman Publishers, Inc., pp. 227-262 (Jan. 1998).

Hamming, *Digital Filters*, Second Edition, "Chapter 2: The Frequency Approach," Prentice-Hall, Inc., pp. 19-31 (Jan. 1983).

Intel Corp., "Intel's Next Generation Integrated Graphics Architecture—Intel® Graphics Media Accelerator X3000 and 3000," 14 pp. (Jul. 2006).

International Search Report and Written Opinion dated Aug. 17, 2010, from International Patent Application No. PCT/US2010/020784, 9 pp.

ISO/IEC, "ISO/IEC 11172-2, Information Technology—Coding of Moving Pictures and Associated Audio for Digital Storage Media at up to about 1.5 Mbit/s—Part 2: Video," 112 pp. (Aug. 1993).

ISO/IEC, "JTC1/SC29/WG11 N2202, Information Technology—Coding of Audio-Visual Objects: Visual, ISO/IEC 14496-2," 329 pp. (Mar. 1998).

ISO/IEC MPEG-2 Test Model 5, "TM5 Overview," 10 pp. (Mar. 1993).

Ito et al., "Rate control for video coding using exchange of quantization noise and signal resolution," Electronics & Communications in Japan, Part II, Hoboken, New Jersey, vol. 83, No. 1, Jan. 1, 2000, pp. 33-43.

ITU-T, "ITU-T Recommendation H.261, Video Codec for Audiovisual Services at $p \times 64$ kbits," 25 pp. (Mar. 1993).

ITU-T, "ITU-T Recommendation H.262, Information Technology—Generic Coding of Moving Pictures and Associated Audio Information: Video," 205 pp. (Jul. 1995).

ITU-T, "ITU-T Recommendation H.263, Video Coding for Low Bit Rate Communication," 162 pp. (Feb. 1998).

Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).

Joint Video Team (JVT) of ISO/IEC MPEG & ITU-T VCEG, "Joint Final Committee Draft (JFCD) of Joint Video Specification," JVT-D157, 207 pp. (Aug. 2002).

Kamikura et al., "Global brightness-variation compensation for video coding" *IEEE Trans. on Circuits and Systems for Video Technology*, vol. 8, No. 8, pp. 988-1000 (Dec. 1998).

Kari et al., "Intensity controlled motion compensation," *Data Compression Conference Proc.*, pp. 249-258, (Mar. 30-Apr. 1, 1998).

Keesman et al., "Transcoding of MPEG Bitstreams," *Signal Processing: Image Communication* 8, pp. 481-500 (Sep. 1996).

Khan et al., "Architecture Overview of Motion Vector Reuse Mechanism in MPEG-2 Transcoding," Technical Report TR2001-01-01, 7 pp. (Jan. 2001).

Kim et al., "Multi-thread VLIW processor architecture for HDTV decoding," *IEEE 2000 Custom Integrated Circuits Conf.*, pp. 559-562 (May 2000).

Knee et al., "Seamless Concatenation—A 21st Century Dream," 13 pp. (Jun. 1997).

Lei et al., "Rate Adaptation Transcoding for Precoded Video Streams," 13 pp. (month unknown, 2000).

Leventer et al., "Towards Optimal Bit-Rate Control in Video Transcoding," *ICIP*, pp. 265-268 (Sep. 2003).

Loomis et al., "VC-1 Technical Overview," 7 pp. (Apr. 2006) [Downloaded from the Internet on Jan. 24, 2007].

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Miyata et al., "A novel MPEG-4 rate control method with spatial resolution conversion for low bit-rate coding," Conference Proceedings / IEEE International Symposium on Circuits and Systems (ISCAS), Kobe, Japan, May 23-26, 2005, pp. 4538-4541.

Mook, "Next-Gen Windows Media Player Leaks to the Web," *BetaNews*, 17 pp. (Jul. 2002) [Downloaded from the World Wide Web on Aug. 8, 2003].

Moshnyaga, "An Implementation of Data Reusable MPEG Video Coding Scheme," *Proceedings of World Academy of Science, Engineering and Technology*, vol. 2, pp. 193-196 (Jan. 2005).

Moshnyaga, "Reduction of Memory Accesses in Motion Estimation by Block-Data Reuse," *ICASSP '02 Proceedings, IEEE International Conference on Acoustics, Speech, and Signal Processing*, vol. 3, pp. III-3128-III-3131 (May 2002).

Nasim et al., "Architectural Optimizations for Software-Bassed MPEG4 Video Encoder," *13th European Signal Processing Conference: EUSIPCO '2005*, 4 pp. (Sep. 2005).

Notice on the First Office Action dated May 31, 2012, for Chinese Patent Application No. 201080006304.9, 7 pp.

NuntiusSystems, Inc., "H.264—a New Technology for Video Compression", downloaded from the World Wide Web, 4 pp. (document marked Mar. 2004).

Oehring et al., "MPEG-2 Video Decompression on Simultaneous Multithreaded Multimedia," *Int. Conf. on Parallel Architectures and Compilation Techniques (PACT '99)*, Newport Beach, CA (Oct. 1999).

Ostermann et al., "Video Coding with H.264/AVC: Tools, Performance, and Complexity," *IEEE Circuits and Systems Magazine*, pp. 7-28 (Aug. 2004).

Ozcelebi et al., "Optimal rate and input format control for content and context adaptive video streaming," 2004 International Conference on Image Processing (ICIP), Singapore, Oct. 24-27, 2004, pp. 2043-2046.

Ozcelebi et al., "Optimal rate and input format control for content and context adaptive streaming of sports videos," 2004 IEEE 6th Workshop on Multimedia Signal Processing, Siena, Italy, Sep. 29-Oct. 1, 2004, pp. 502-505.

Printouts of FTP directories from http://ftp3.itu.ch, 8 pp. [Downloaded from the World Wide Web on Sep. 20, 2005].

Reader, "History of MPEG Video Compression—Ver. 4.0," 99 pp. [Document marked Dec. 16, 2003].

Reed et al., "Optimal multidimensional bit-rate control for video communication," IEEE Transactions on Image Processing, vol. 11, No. 8, pp. 873-874 (Aug. 1, 2002).

Roy et al., "Application Level Hand-off Support for Mobile Media Transcoding Sessions," *Proceedings of the 12th International Workshop on Network and Operating Systems Support for Digital Audio and Video*, 22 pp. (May 2002).

Sambe et al., "High-speed Distributed Video Transcoding for Multiple Rates and Formats," *IEICE Trans on Information and Systems*, vol. E88-D, Issue 8, pp. 1923-1931 (Aug. 2005).

Senda et al., "A Realtime Software MPEG Transcoder Using a Novel Motion Vector Reuse and a SIMD Optimization Techniques," *ICASSP '99 Proceedings, 1999 IEEE International Conference on Acoustics, Speech, and Signal Processing*, vol. 4, pp. 2359-2362 (Mar. 1999).

Shanableh et al., "Heterogeneous Video Transcoding to Lower Spatio-Temporal Resolutions and Different Encoding Formats," *IEEE Transactions on Multimedia*, 31 pp. (Jun. 2000).

Shanableh et al., "Transcoding of Video Into Different Encoding Formats," *ICASSP-2000 Proceedings*, vol. IV of VI, pp. 1927-1930 (Jun. 2000).

SMPTE, "Proposed SMPTE Standard for Television: VC-1 Compressed Video Bitstream Format and Decoding Process," SMPTE 421M, pp. i-xx, 5-7, 23-27 (Aug. 2005).

SMPTE, "SMPTE 327M-2000—MPEG-2 Video Recoding Data Set," 9 pp. (Jan. 2000).

Sun et al., "Architectures for MPEG Compressed Bitstream Scaling," *IEEE Transactions on Circuits and Systems for Video Technology*, vol. 6, No. 2, pp. 191-199 (Apr. 1996).

Sun et al., "Lossless Coders," *Digital Signal Processing for Multimedia Systems*, Chapter 15, pp. 385-416 (Mar. 1999).

Swann et al., "Transcoding of MPEG-II for Enhanced Resilience to Transmission Errors," Cambridge University Engineering Department, Cambridge, UK, pp. 1-4 (Sep. 1996).

Takahashi et al., "Motion Vector Synthesis Algorithm for MPEG2-to-MPEG4 Transcoder," *Proc. of SPIE*, vol. 4310, pp. 872-882 (Jan. 2001).

Tan et al., "On the Methods and Performances of Rational Downsizing Video Transcoding," *Signal Processing: Image Communication* 19, pp. 47-65 (Jan. 2004).

Tektronix Application Note, "Measuring and Interpreting Picture Quality in MPEG Compressed Video Content," 8 pp. (2001).

Tsai et al., "Rate-Distortion Model for Motion Prediction Efficiency in Scalable Wavelet Video Coding," *17th International Packet Video Workshop*, 9 pp. (May 2009).

Tudor et al., "Real-Time Transcoding of MPEG-2 Video Bit Streams," *BBC R&D*, U.K., 6 pp. (Sep. 1997).

Van Der Tol et al., "Mapping of MPEG-4 decoding on a flexible architecture platform," *Proceedings of the SPIE, Media Processors*, vol. 4674, 13 pp. (Jan. 2002).

Van Der Tol et al., "Mapping of H.264 decoding on a multiprocessor architecture," *Proceedings of the SPIE*, vol. 5022, pp. 707-718 (May 2003).

Vetro et al., "Complexity-Quality Analysis of Transcoding Architectures for Reduced Spatial Resolution," *IEEE Transactions on Consumer Electronics*, 9 pp. (Aug. 2002).

Vishwanath et al., "A VLSI Architecture for Real-Time Hierarchical Encoding/Decoding of Video Using the Wavelet Transform," *Proc. ICASSP*, 5 pp. (Apr. 1994).

Watkinson, *The MPEG Handbook*, pp. 275-281 (Nov. 2004).

Werner, "Generic Quantiser for Transcoding of Hybrid Video," *Proc. 1997 Picture Coding Symposium*, Berlin, Germany, 6 pp. (Sep. 1997).

Werner, "Requantization for Transcoding of MPEG-2 Intraframes," *IEEE Transactions on Image Processing*, vol. 8, No. 2, pp. 179-191 (Feb. 1999).

Wiegand et al., "Overview of the H.264/AVC Coding Standard," *IEEE Trans. on Circuits and Systems for Video Technology*, vol. 13, No. 7, pp. 560-576 (Jul. 2003).

Youn et al., "Video Transcoder Architectures for Bit Rate Scaling of H.263 Bit Streams," *ACM Multimedia 1999*, Orlando, Florida, pp. 243-250 (Oct. 1999).

Zhou et aL, "Motion Vector Reuse Algorithm to Improve Dual-Stream Video Encoder," *ICSP 2008, 9th International Conference on Signal Processing*, pp. 1283-1286 (Oct. 2008).

\* cited by examiner

MULTIPLE BIT RATE VIDEO ENCODING USING VARIABLE BIT RATE AND DYNAMIC RESOLUTION FOR ADAPTIVE VIDEO STREAMING

BACKGROUND

With the increasing popularity of playing streaming audio and video over networks such as the internet, there is a need for optimizing the data transferred from a server to a client such that the client's experience is maximized even if network conditions during playback are inconsistent. Optimizing the client's experience involves choosing a quality level for encoding the audio and video portions of the video playback such that the video can be transferred and reconstructed uninterrupted while preserving the quality of the video content.

The quality level is generally dictated by the bit rate specified for the encoded audio or video portions of the input stream. A higher bit rate generally indicates that a larger amount of information about the original audio or video is encoded and retained, and therefore a more accurate reproduction of the original input audio or video will be presented during video playback. Conversely, a lower bit rate indicates that less information about the original input audio or video is encoded and retained, and thus a less accurate reproduction of the original audio or video will be presented during video playback.

Generally, the bit rate is specified for encoding each of the audio and video based on several factors. The first factor is the network condition between the server and the client. A network connection that can transfer a high amount of data indicates that a higher bit rate can be specified for the input video that is subsequently transferred over the network connection. The second factor is the desired start-up latency. Start-up latency is the delay that a video playback tool experiences when first starting up due to the large amount of data that has to be received, processed, and buffered. The third factor is the tolerance to glitching. Glitching is when video playback has to stop because data is missing. In most cases any amount of start-up latency or glitching is intolerable, and it is therefore desirable to optimize the bit rate specified such that the start-up latency and the glitching are minimized or eliminated.

Currently available commercial streaming media systems rely on multi bit rate (MBR) coding to perform coding rate control. In MBR coding, source video content is encoded into alternative bit streams at different coding rates and typically stored in the same media file at the server. This then allows the content to be streamed in segments or chunks at varying levels of quality corresponding to different coding rates according to the changing network conditions, typically using bit stream switching between segments.

The currently available multi bit rate video streaming systems use a constant bit rate approach to encoding each alternative video stream. However, a typical video will generally include scenes having a wide variety of visual complexity. However, the constant bit rate approach can not efficiently encode video segments with different quality. The constant bit rate approach unnecessarily spends too many bits for encoding low complexity video segments, and conversely the high complexity scenes are allocated too few bits. Consequently, the constant bit rate approach to encoding the alternative streams results in video quality for internet streaming that is undesirable and inconsistent.

The currently available multi bit rate video streaming systems also have a further requirement for the final display resolution to be fixed. By maintaining a fixed display resolution, the video streams at the multiple bit rates can all be decoded and scaled to this same final display resolution in order to achieve a glitch free video presentation. With the fixed display resolution, the various alternative video streams can have a wide range of bit rates from a few megabits per second to a few kilobits per second. One problem is to match an appropriate video resolution to each video stream bit rate. The currently available multi bit rate video streaming systems use a pre-defined encoding resolution, which again may not be well suited to the varying complexity of the video scenes. For low complexity video, the pre-defined resolution may be too small. For complex video, the pre-defined resolution may be too large.

SUMMARY

The following Detailed Description concerns techniques (implemented via methods, devices and systems) for multiple bit rate video encoding, which are intended to make better use of the available bits with each bit rate so as to achieve generally higher quality video.

According to one technique described herein, a multiple bit rate video encoder encodes a plurality of video streams for multiple bit rate video streaming with an objective of providing a more consistent video quality. For encoding the highest bit rate video stream, the bit rate at which the stream is encoded is allowed to vary subject to certain constraints: a peak bit rate constraint and an average bit rate constraint. For a lowest bit rate stream, the multiple bit rate video encoder encodes the stream with a constant chunk (a given size group of pictures) rate approach. Video streams at intermediate bit rates are encoded at progressively decreasing variable bit rates (subject to decreasing peak and average bit rate constraints).

According to a further technique described herein, the multiple bit rate video encoder also dynamically varies the video resolution of the streams. For each bit rate, the video encoder dynamically decides the resolution based on the video content of a scene (which may comprise one or more groups of pictures) in order to achieve better visual quality. The multiple bit rate video encoder selects a higher video resolution for groups of pictures that have less complex video content, whereas a lower resolution is assigned for groups of pictures that have higher complexity. This dynamic resolution approach allows the multiple bit rate video encoder to achieve a generally better video quality for a given bit rate.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following detailed description concerns various techniques and systems for video encoding using variable bit rate and dynamic resolution to produce video streams at multiple bit rates for streaming. Although the techniques are described in the context of their application to a multiple bit rate streaming application, the techniques can be applied more broadly to other video encoding applications.

The various techniques and tools described herein may be used independently. Some of the techniques and tools may be used in combination. Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

I. Multi Bit Rate Video Streaming

Figure 1:
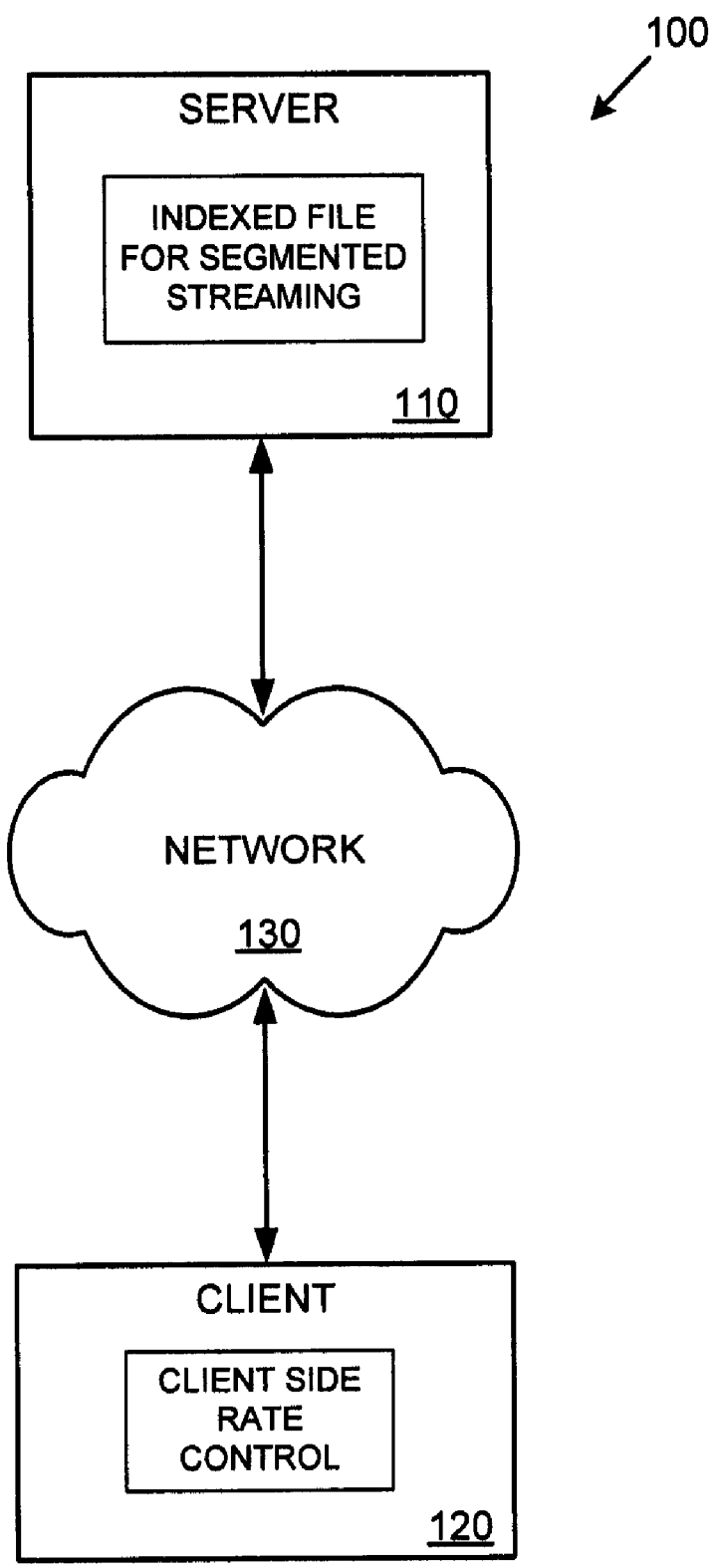
FIG. 1 is a block diagram of a video streaming system that provides segmented streaming of video at variable bit rates.

FIG. 1 depicts a generalized block diagram of a system 100 for segmented streaming of multimedia content contained in an indexed video stream file. The indexed file generally divides video of a multimedia program into multiple streaming segments, and contains a number of compressed bit streams representing the video segments at various bit rates. Although the MBR video streams are described as separate coded streams, alternative implementations can have some or all of the MBR video streams encoded as one coded compressed video stream with multiple coding layers. In the system 100, a server 110 (e.g., a server computer system such as a standard HTTP server) provides multimedia content to a client 120 (e.g., a client computer system, such as a laptop or desktop computer, or another type of computing device, such as a PDA or mobile phone) via a network 130 (e.g., the Internet). In the system 100, the server 110 stores programs in an indexed file. The client 120 comprises client-side rate control software and/or hardware.

In one specific example implementation, the server 110 is a standard HTTP server without any specialized streaming capability other than the ability to serve files. Because the server 110 does not support any specialized bit rate selection capability, the client 120 must perform all bit rate selection activities. In this implementation, the client 120 performs all bit rate selection activities. For example, the client 120 can perform rate control using the index information obtained from the server 110 (e.g., alone or in combination with other information, such as client buffer information, network bandwidth, etc.). However, in other implementations, some or all of the rate-control functions can occur at the server.

In general, the indexed file for multi bit rate streaming can be used by standard HTTP servers to serve multimedia content at multiple bit rates with bit rate selection (rate control) being performed client-side (e.g., exclusively client-side). Clients can perform rate control by first obtaining index information from the server describing the various bit rates available for streaming segments of a program. Based on the index information, and possibly other information (e.g., network bandwidth, buffer information, etc.), the client can decide which bit rate streaming segments to download from the server to provide a desired user experience (e.g., the best user experience possible based on the available bit rates and current network conditions).

Other types of computing devices (e.g., other than traditional HTTP servers) can provide files using the indexed file. For example, a computing device (e.g., a personal computer, server computer, or special-purpose streaming media server) can use the indexed file layout to serve multimedia content using various file serving protocols (e.g., File Transfer Protocol (FTP), Hypertext Transfer Protocol (HTTP), Real Time Streaming Protocol (RTSP), MMS (Microsoft Media Services), etc.).

In order to support bit rate switching, programs are divided into temporal chunks called streaming segments (self-contained units). The server stores each streaming segment at one or more bit rates (e.g., each streaming segment—bit rate combination is a separate streaming segment encoding). Each streaming segment includes one or more available bit rate encodings for a specific track (e.g., a specific audio track, such as an English audio track, or a specific video track) of a program. Clients then determine which bit rate, from the available bit rates (e.g., from the available streaming segment encodings), to download for each streaming segment. For example, a client may obtain a first streaming segment, for a video track, encoded at 250 Kb/sec (kilo-bits per second) (from one or more available streaming segment encodings for the first streaming segment), a second streaming segment, for the video track, encoded at 500 Kb/sec (from one or more available streaming segment encodings for the second streaming segment), and a third streaming segment, for the video track, encoded at 1 Mb/sec (mega-bit per second) (from one or more available streaming segment encodings for the third streaming segment). In the illustrated streaming system 100, each streaming segment contained in the indexed file is encoded by a video encoder at a variable bit rate (VBR) and variable resolution, as described below.

II. Video Encoder Overview

Figure 2:
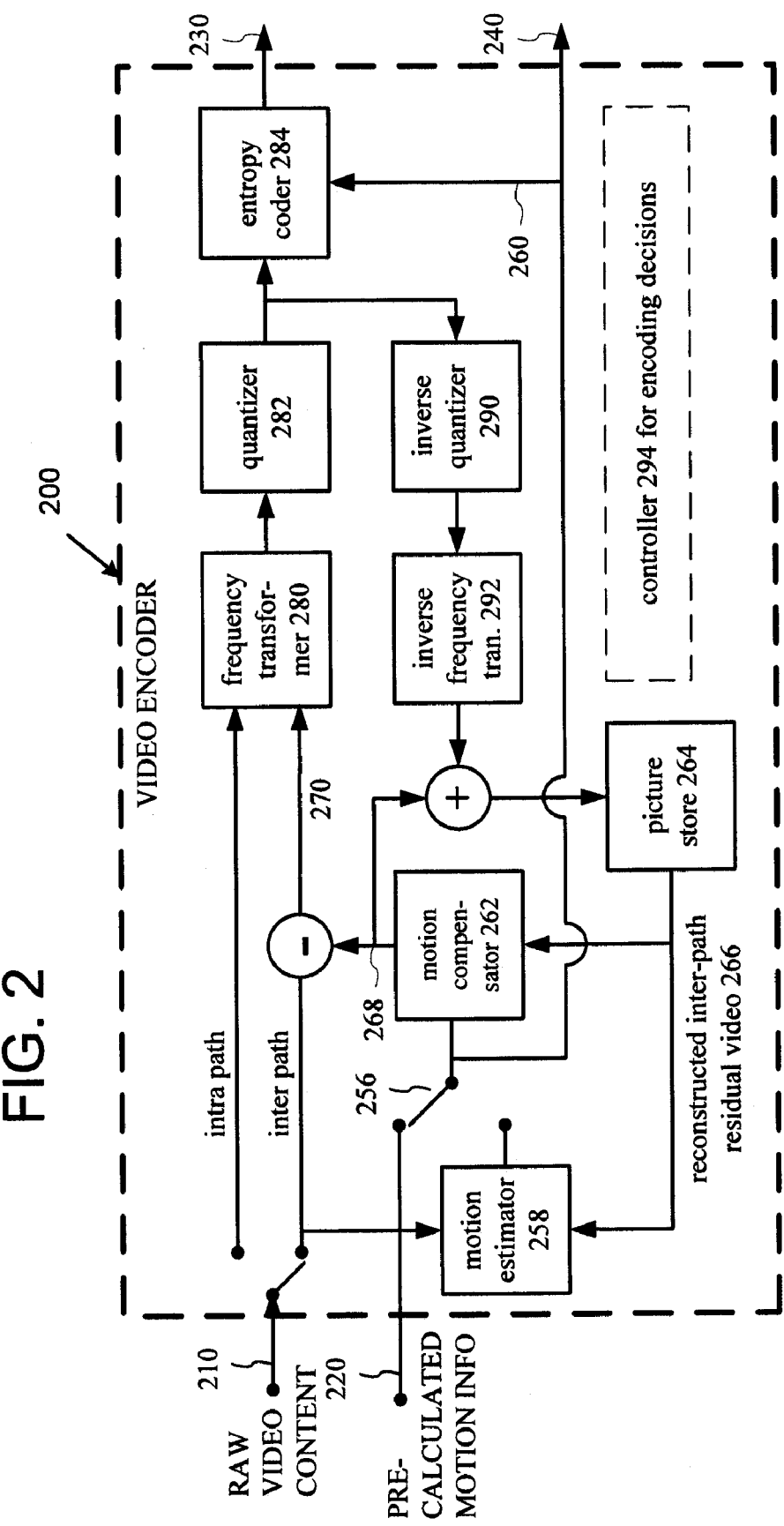
FIG. 2 is a block diagram of a generalized implementation of a video encoder for encoding streams at varying bit rates for the video streaming system of FIG. 1.

FIG. 2 depicts one example of a video encoder 200 that can be used for encoding video for multi bit rate video streaming. The video encoder 200 has inputs 210, 220 for receiving "raw" (uncompressed) frames of video content and also previously calculated motion information for the video content. The video encoder then performs intra-frame coding of reference frames of the video content, and utilizes the motion information to perform inter-frame coding of the predicted frames of the video content. The encoding can be performed according to a known video encoding standard, such as Windows Media Video format, SMPTE 421-M format, MPEG-x format (e.g., MPEG-1, MPEG-2, or MPEG-4), H.26x format (e.g., H.261, H.262, H.263, or H.264), or other format. However, in the case of inter-frame coding, the video encoder can choose to use the pre-calculated motion information for the inter-frame coding of a predicted frame, rather than performing its own motion estimation for the frame. The video encoder encodes the video content into a compressed bitstream provided as output 230. The video encoder may also output the motion information that it used for inter-frame compression of the input video content as motion information output 240 (such as for encoding a lower bit rate video stream for the multiple bit rate video streaming).

FIG. 2 is a generalized block diagram showing one example suitable implementation of the video encoder 200 for producing multiple bit rate video streams using variable bit rate and variable resolution encoding for the multiple bit rate video streaming system 100. The video encoder 200 receives a sequence of video pictures (frames) as its raw video content input 210 and produces a compressed bit stream 230 as output.

The video encoder 200 processes video pictures. The term "picture" generally refers to source, coded, or reconstructed image data. For progressive video, a picture is a progressive video frame. For interlaced video, a picture may refer to an interlaced video frame, the top field of the frame, or the bottom field of the frame, depending on context.

The video encoder 200 compresses inter-coded, predicted pictures of the input video and intra-coded pictures of the input video. For the sake of presentation, FIG. 2 shows a path for intra-coded frames through the encoder 200 and a path for inter-coded predicted frames. Many of the components of the video encoder 200 are used for compressing both intra-coded content and inter-coded, predicted content. The exact operations performed by those components can vary depending on the type of information being compressed.

In general, within the video encoder 200, an inter-coded, predicted frame (as a picture) is represented in terms of prediction from previously reconstructed content (as one or more other pictures, which are typically referred to as reference pictures or anchors). For example, content at a given time is encoded as a progressive P-frame or B-frame, interlaced P-field or B-field, or interlaced P-frame or B-frame. Within the video encoder 200, a prediction residual is the difference between predicted information and corresponding intra-coded frames.

The input video 110 content on the inter-path is encoded as a predicted picture based on motion information. If certain conditions are met, the video encoder 100 uses the pre-calculated motion information from input 120 (as illustrated by selection switch 256), which can be in the form of a set or sequence of motion vector for macroblocks or other sets of samples of the inter-path video picture with respect to one or more reference pictures. In general, the choice to use the pre-calculated motion information can be based on: first, the availability of pre-calculated motion information; and second, which and whether encoding parameters were changed from the previous calculation of the motion information and the parameters used for the current encoding of the video content. In one example, the video encoder will choose not to use the previously calculated motion information from input 130 if the motion information was calculated for encoding the video content with a different video resolution than that which the video encoder is current encoding.

However, the video encoder 100 can instead choose (again illustrated by selection switch 256) to perform new motion estimation for the inter-path video content 110 with motion estimator 258. The motion estimator 258 estimates motion of macroblocks or other sets of samples of the video picture with respect to one or more reference pictures, which represent reconstructions of previously encoded video content frames. The picture store 264 buffers this reconstructed video content 266 as a reference picture or pictures. When multiple reference pictures are used, the multiple reference pictures can be from different temporal directions or the same temporal direction. The motion estimator 258 outputs motion information 260 such as motion vector information.

The motion compensator 262 applies motion vectors to certain reconstructed video content 266 (stored as reference picture(s)) when forming a motion-compensated current picture 268. The difference (if any) between a block of the motion-compensated picture 268 and corresponding block of the original inter-path video picture is the prediction residual 270 for the block. During later reconstruction of the inter-path video frame (e.g., at a video decoder), reconstructed prediction residuals are added to the motion compensated residual video 268 to obtain reconstructed content closer to the original inter-path video 256. In lossy compression, however, some information is still lost from the original inter-path video. Alternatively, a motion estimator and motion compensator apply another type of motion estimation/compensation.

A frequency transformer 280 converts spatial domain video information into frequency domain (i.e., spectral, transform) data. For block-based video content, the frequency transformer 280 applies a DCT, variant of DCT, or other forward block transform to blocks of the samples or prediction residual data, producing blocks of frequency transform coefficients. The frequency transformer 280 may apply an 8×8, 8×4, 4×8, 4×4 or other size frequency transform.

A quantizer 282 then quantizes the blocks of transform coefficients. The quantizer 282 applies non-uniform, scalar quantization to the spectral data with a step size that varies spatially on a picture-by-picture basis, macroblock-by-macroblock basis or other basis. Additionally, in some cases the quantizer varies quantization across color channels of the inter-layer residual video picture. The quantizer 282 can also apply another type of quantization, for example, a uniform or adaptive quantization for at least some spectral data coefficients, or directly quantizes spatial domain data in an encoder system that does not use frequency transformations.

When reconstructed video content is needed for subsequent motion estimation/compensation of an inter-path video picture, an inverse quantizer 290 performs inverse quantization on the quantized spectral data coefficients. An inverse frequency transformer 292 performs an inverse frequency transform, producing blocks of reconstructed prediction residuals (for predicted inter-path residual video content) or samples (for intra-path residual video content). If the residual video content 256 was motion-compensation predicted, the reconstructed prediction residuals are added to the motion-compensated predictors 268 to form the reconstructed residual video. The picture store 264 buffers the reconstructed residual video for use in subsequent motion-compensated prediction.

The entropy coder 284 compresses the output of the quantizer 282 as well as certain side information (e.g., quantization parameter values) Typical entropy coding techniques include arithmetic coding, differential coding, Huffman coding, run length coding, LZ coding, dictionary coding, and combinations of the above. The entropy coder 284 typically uses different coding techniques for different kinds of information, and can choose from among multiple code tables within a particular coding technique.

When the video encoder 240 performs intra-compression of the intra-path video content, the encoder intra-compresses it as an intra-coded picture, without motion compensation. The video 256 is provided directly to the frequency transformer 280, quantizer 282, and entropy coder 284 and output as encoded video. A reconstructed version of the intra-coded video can be buffered for use in subsequent motion compensation of other inter-path video.

A controller 294 receives inputs from various modules such as the motion estimator 258, frequency transformer 280, quantizer 282, inverse quantizer 290, and entropy coder 284. The controller 294 evaluates intermediate results during encoding, for example, setting quantization step sizes and performing rate-distortion analysis. The controller 294 works with other modules to set and change coding parameters during encoding. When the controller 294 evaluates different coding parameter choices, the controller 294 may iteratively perform certain stages to evaluate different parameter settings, or the controller 294 may jointly evaluate different coding parameters. The tree of coding parameter decisions to be evaluated, and the timing of corresponding encoding, depends on implementation. In some embodiments, the controller 294 also receives input from an encoding session wizard interface, other encoder application interface, or other source to designate video to be encoded using specific rules.

III. Variable Bit Rate Encoding of MBR Streams

Figure 3:
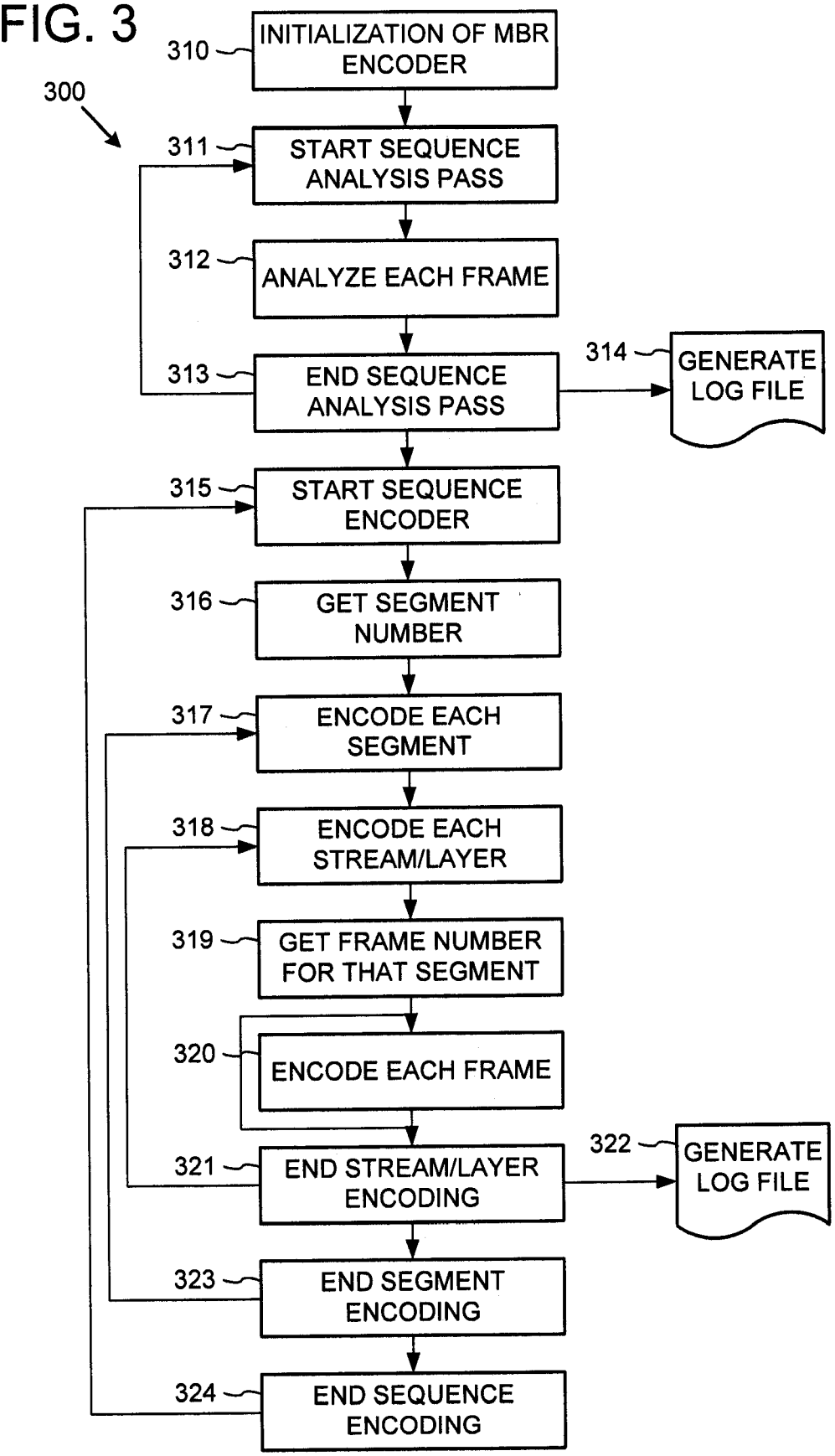
FIG. 3 is a process flow chart for a multiple bit rate video encoding system that applies a variable bit rate approach and dynamic resolution approach to encoding video using the video encoder of FIG. 2 for streaming by the system of FIG. 1

For the multiple bit rate video streaming system 100 (FIG. 1, a multiple bit rate video encoding system separately encodes the input video as a set of compressed video streams with successively decreasing overall bit rates. Although described herein as encoding separate individual MBR video streams, an alternative implementation of the MBR video streaming system and encoding system can encode one or more of the MBR video streams as a compressed bitstream having multiple separable coding layers. The multiple bit rate video encoding system includes an MBR encoding engine (not shown) that drives the video encoder 200 (FIG. 2) to encode the input video with varying encoding parameters according to a multiple bit rate encoding process (as shown in FIG. 3) that implements a variable bit rate and dynamic resolution approach described in this and the following section. The MBR encoding engine can provides a user interface or console for receiving user input to configure parameters for the MBR video stream encoding (or alternatively an application programming interface to receive such input from a caller application), such as the number of streams, and other parameters mentioned below.

In contrast to other currently available multiple bit rate video streaming systems (which use a constant bit rate approach to encoding the multiple video streams), the MBR encoding system for the multiple bit rate video stream system 100 aims at providing a constant or consistent quality for each video stream. For the top MBR video stream (generally having highest overall bit rate), the video encoder 200 encodes the video stream with a varying bit rate constrained to fall under a specified peak bit rate while satisfying a specified average bit rate. For the bottom MBR stream (generally having the lowest bit rate of the set), the video encoder uses a constant chunk rate approach. In the context of the multiple bit rate video streaming system, the term chunk refers to a group of pictures (GOP) into which the video stream are segmented, and define the level of granularity at which the video streaming system may switch playing individual segments between video streams. The constant chunk rate approach enables the video streaming system to guarantee predictability of streaming, in that when the lowest bit rate or quality video stream is streamed, the client will receive the chunk amount of pictures at the constant rate so as to maintain minimum quality continuous playing of the video.

In between the lowest and highest overall bit rate streams, the video encoder encodes one or more intermediate video streams also using variable bit rates of coding within the constraints of a peak bit rate and average bit rate that aim to maintain a constant video quality. The peak and average bit rate constraints of the intermediate video streams can be specified to decrease progressively in a proportional, logarithmic or other decreasing manner. For example, the average bit rate of the intermediate stream can decrease proportionally to be ¾, ½, and ¼ that of the average bit rate constraint of the highest bit rate video stream. In this way, the video streaming system 100 is able to provide an instant start and swift video switching from a guaranteed low constant chunk rate up to a highest quality variable rate bit stream. The peak and average bit rates, as well as the constant chunk rate are encoding parameters that can be configured by the user. These parameters can be configured explicitly by the user, or calculated by the MBR encoding system engine based on more generalized parameters input by the user. For example, the MBR encoding engine can have an automatic mode where the user (or a caller application) simply specifies the minimal and maximal target bit rates and a number of video streams or layers. The engine in this automatic mode then calculates all the intermediate bit rate constraints (peak and average) in a uniform, logarithmic or other distribution space.

With reference now to FIG. 3, the MBR encoding system encodes the set of MBR video streams with a process 300 that uses a two pass encoding approach. This process includes an analysis pass and an encoding pass. The goal of the analysis pass is to find the scene complexity of the video content based on the encoding configurations as well as the input video source material itself. Once this information is extracted in the analysis pass, the following encoding pass then generates the set of MBR video streams.

The MBR encoding process 300 begins with an initialization step 310. In this step, the MBR encoding process determines the parameters for the encoding from user input, including number of MBR video streams, peak and average bit rate constraints for the streams, and the constant chunk rate of the lowest quality MBR video stream, and segment parameters, among others.

The analysis pass of the MBR encoding process 300 includes actions 311-314. In the analysis pass, the MBR encoding engine analyzes the input source video frame by frame. The analysis includes a number of different tasks including scene change detection, segmenting a video sequence between scene change boundaries into group of picture segments, and video frame complexity measurements. Based on the scene change detection, the MBR encoding engine marks boundaries at which scene changes occur during the video. Between marked boundaries of a video sequence (sequence mark-in and sequence mark-out positions), the MBR encoding process 300 further determines a total number of group of pictures segments in which to divide the video sequence within user-specified constraints (such as a specified average GOP length and maximum allowed GOP length within a scene) and sets boundaries of each group of pictures. Once the GOP boundaries are defined, the total numbers of frames within each GOP is calculated by the MBR encoding engine. The MBR encoding engine also calculates a set of three texture measurements per frame of each group of pictures, which are used in the variable resolution encoding described in the next section. The three texture measurements include a frame global texture, frame horizontal texture and frame vertical texture measurement. The MBR engine writes these analysis pass results (the scene and GOP boundaries, and the texture measurements) into a log file, as indicated at action 314.

For the encoding pass (actions 315-324), the MBR engine applies the results of the analysis pass to encode the MBR video streams using the video encoder 200 (FIG. 2). The MBR engine causes the video encoder 200 to encode each segment (action 317) for all the MBR streams (action 318). For each segment of an MBR video stream, the MBR encoding engine controls the encoding parameters of the video encoder 200 in an attempt to hit user specified targets for an average bit rate. If the source video content is too complex to be encoded at the targeted bit rate, the MBR encoding engine starts to increase the quantization step size in order to achieve a better visual quality. The top or best quality video stream is encoded subject to a maximal peak bit rate constraint meeting the user specified MBR encoding parameters. For the bottom or lowest quality video stream, the MBR engine controls the video encoder to produce an encoding of the video stream to meet the constant chunk rate constraint, which helps guarantee client side predictability for playing the streamed video. In intermediate video streams, the MBR engine causes the video encoder to encode the source video with encoding parameters to produce the video stream a variable bit rate falling within maximal peak and average bit rate constraints for the respective intermediate stream.

As a result of the encoding pass, the MBR engine then outputs compressed video bit streams for the set of MBR streams that are produced using the video encoder, as well as a log file. With the variable bit rate approach of this MBR encoding process 300, the MBR engine produces a set of MBR video streams that decreases evenly from a top to bottom quality stream for each GOP. With this set of MBR video streams, the MBR system 100 (FIG. 1) can deliver a desired constant or consistent visual quality for the video sequence according to the available connection bandwidth.

IV. Variable Resolution Encoding of MBR Streams

The MBR encoding engine also applies a technique that dynamically varies resolution of encoding for each of the MBR video streams. For each video stream ranging from the top to bottom of the MBR video streams, the MBR encoding engine dynamically decides the resolution for encoding each video GOP to produce a better visual quality. For each video stream, the MBR encoding engine assigns a higher resolution to a low complexity GOP (or segment), while a more complex GOP (or segment) is assigned a lower resolution of encoding.

In the example implementation, the MBR encoding engine applies the decision to dynamically resize each GOP at scene boundaries of the video. This avoids introducing any undesirable visual effects that resizing video resolution in the middle of a video scene might produce. For example, in a scene featuring a "talking head," varying the video resolution mid-scene could introduce a noticeable popping or pulsing as the detail edges and features in the scene sharpen or soften along with the resolution change. Accordingly, the MBR encoding engine performs the below described process for the GOP or GOPs of a scene (e.g., for the first GOP after a scene change boundary identified in the analysis phase described above).

Figure 4:
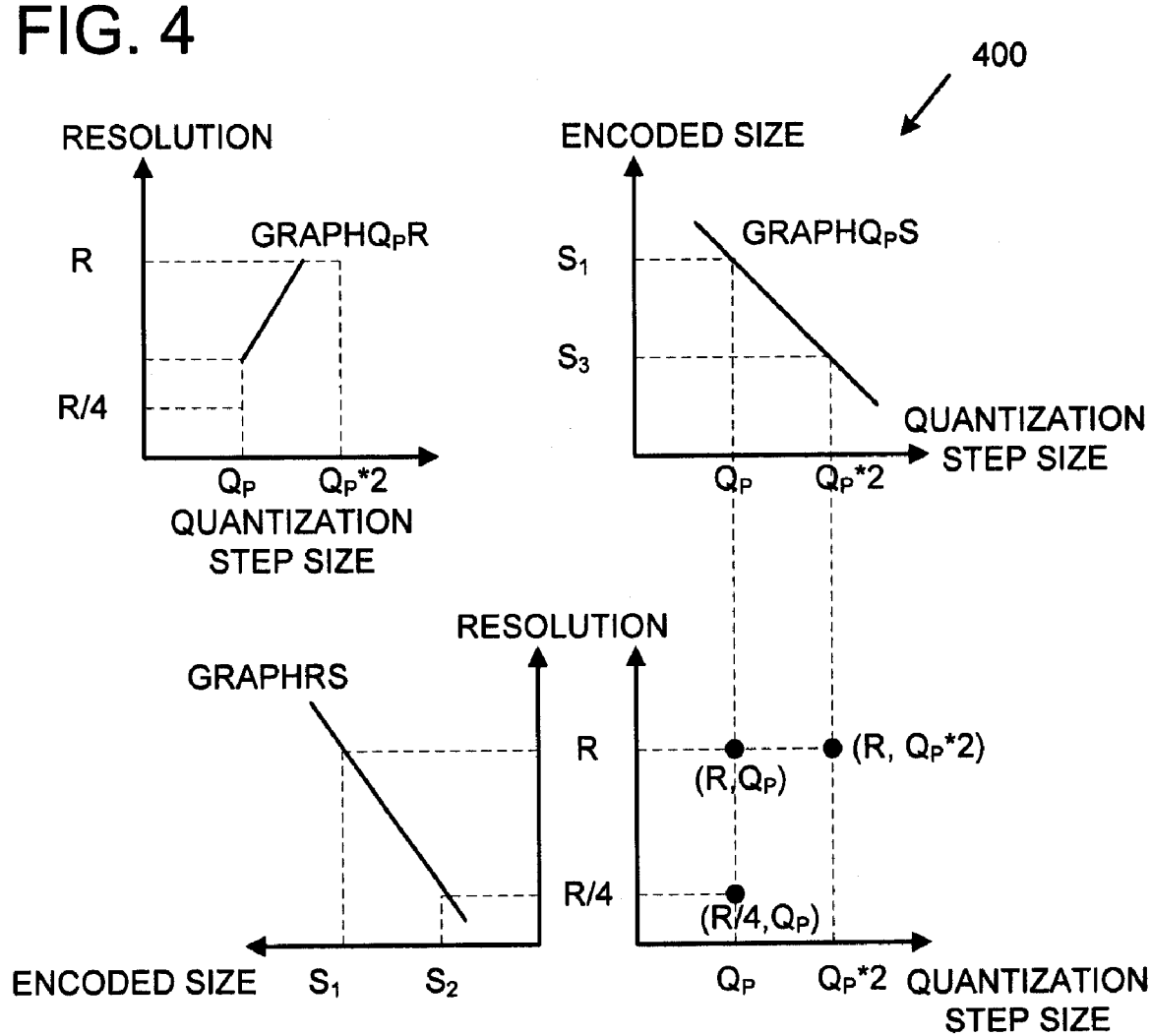
FIG. 4 is a graph of a relation between resolution, quantization step size and coded size for an example stream for use in a three point sampling approach to dynamic resolution selection.

In one example implementation of the dynamic resolution encoding, the MBR encoding engine uses a three-point sampling approach to make the dynamic resolution decision. Each sampling point represents the result (in terms of actual encoded bit rate or size) from encoding the GOP using three different pairs of video resolution and quantization step sizes. With these three sampling point results, the MBR engine establishes a model of the relation between resolution, quantization step size and coded size, which relation is illustrated graphically in FIG. 4. From this dynamically extracted model for the video sequence, the MBR encoding engine can then decide a resolution for each targeted bit rate of the MBR video streams. In alternative implementations, the MBR encoding engine can use more sampling points to establish the model. However, the three sampling point approach is found to be sufficient to establish the model while remaining most practical for purposes of encoding speed.

Figure 5:
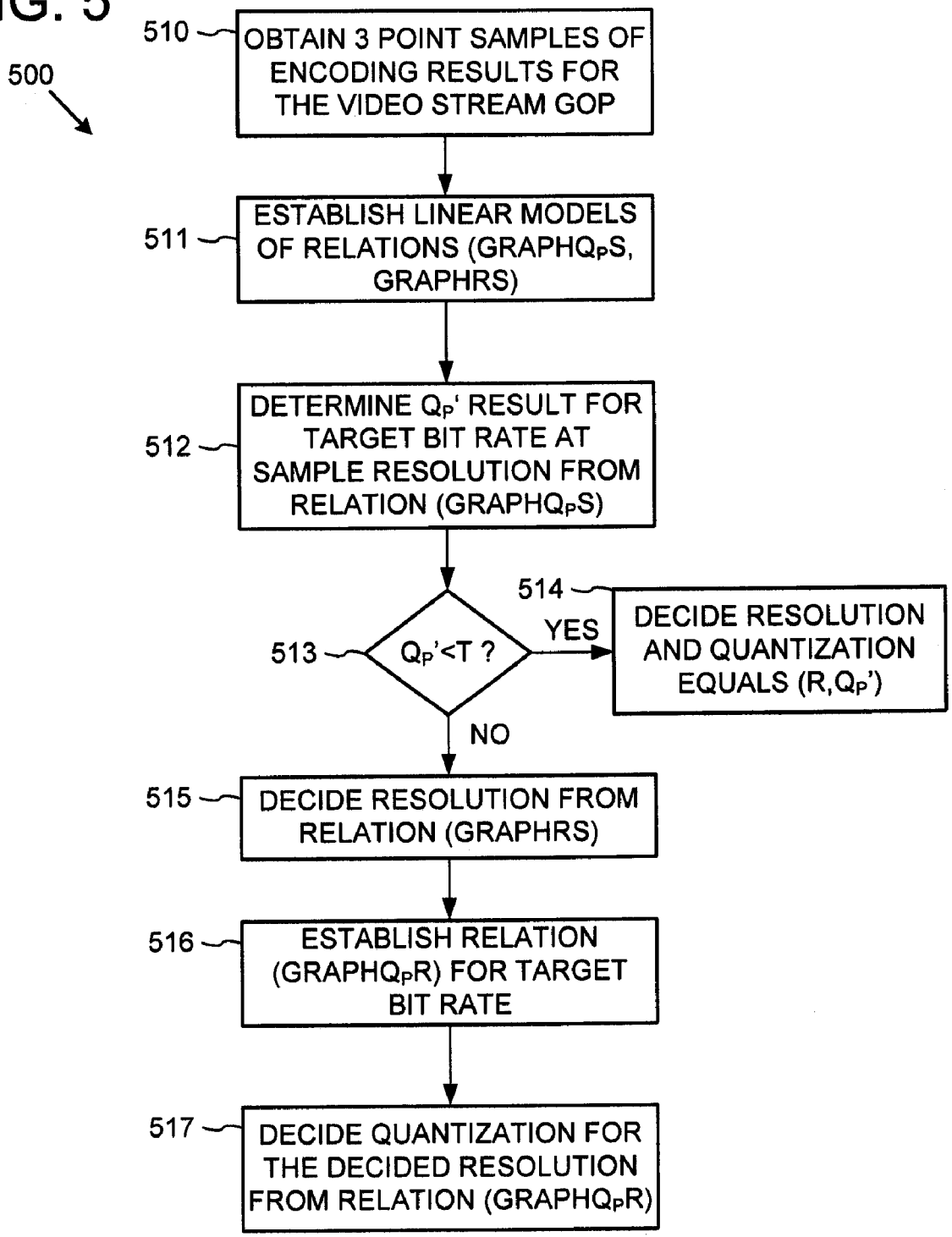
FIG. 5 is a process flow chart for a dynamic resolution decision by the multiple bit rate video encoding system.

FIG. 5 illustrates a process 500 performed by the MBR video encoding engine for making the dynamic resolution decision for a GOP of each video stream. The process 500 begins with obtaining the three sample points of encoding results (action 510). The MBR encoding engine controls the video encoder 200 to encode the segment or GOP with three parameter combinations for resolution and quantization step size. The initial sample resolution may be chosen based on a desired display resolution for the video. The initial sample quantization step size can be chosen depending on the particular codec standard used by the video encoder. For example, in the case of the SMPTE 421-M video codec, the initial sample quantization step size may be chosen to be 4. In the case of that the video encoder uses the H.264 standard, an appropriate initial sample quantization step size may be 28. However, other initial sample quantization step sizes and resolutions can instead be selected.

In the illustrated model, the MBR video encoding engine performs the encoding for an initial sample resolution and quantization step size parameter pair (R, $Q_p$), as well as at one fourth of the initial sample resolution (i.e., (R/4, $Q_p$)) and at twice the initial sample quantization step size (i.e., (R, $Q_p*2$)). Alternatively, other parameter pairs for the sample points can be used, such as at half resolution, four times the quantization step size, etc. The MBR video encoding engine observes the encoded bit sizes ($S_1$, $S_2$, and $S_3$) that result from encoding the GOP of the video stream with the three resolution and quantization step size parameter pairs.

In a next action 511, the MBR engine establishes two linear models: one for the relation between quantization step size and encoded size (labeled Graph$Q_p$S in the diagram of FIG. 4), and one for the relation between resolution and encoded size (GraphRS). The relation between quantization step size and encoded size is determined by the encoded sizes that result from the two sample points where the quantization step size is varied while the resolution is held constant, while conversely the relation between resolution and encoded size is determined from the two sample points which vary the resolution while quantization step size remains constant.

At action 512, the MBR engine uses the relation of encoded size to quantization step size to find the quantization step size that yields the encoded size corresponding to the desired bit rate. This is the modeled result quantization step size (labeled $Q_p'$) at the full sampling resolution R that should yield the target bit rate for the GOP of the video stream.

The MBR engine then compares the modeled result quantization step size to an empirically determined threshold (determined from experiments measuring video texture over a wide range of video content). If the modeled result quantization step size is smaller than the threshold, then the MBR engine decides to use the full sample resolution and modeled result quantization step size, i.e., (R, $Q_p'$) at action 514.

More specifically, the MBR engine determines the appropriate quantization step threshold based on the per frame texture measurements made during the analysis phase (discussed above) for the input video content. The MBR engine calculates the texture measurements for the GOP by averaging the frame texture measurements for all frames in the GOP. This produces GOP global texture, GOP horizontal texture and GOP vertical texture measurements. Of these, the GOP global texture measurement determines the quantization step size threshold that controls when to resize video resolution. From experimental results over a broad range of video content (including sports, television, movies, etc.), it has been determined that a quantization step size threshold of $Q_p$ equal to 12 (for video encoding with the SMPTE 421M standard) is suitable for video with a typical GOP global texture measurement. In other words, if the modeled result quantization step size $Q_p'$ is over 12, then the MBR encoder should resize to a lower video resolution in order to encode at a lower $Q_p$. However, in an example implementation, the MBR encoder can further vary the quantization step size threshold for resizing depending on the overall global texture measurement for the video. The MBR encoder has established a linear relationship between global texture and the quantization step size threshold for resizing. For video having a low overall global texture, a lower quantization step size threshold is expected. This allows the MBR encoder to be more aggressive in resizing down the video resolution of video content having a lot of smooth regions (for which resizing to a lower resolution would tend not to produce artifacts). Whereas, for video with high global texture, the MBR encoder expects a higher quantization step size threshold for resizing. Such higher threshold makes the MBR encoder more careful in resizing down video resolution of frames that have a lot of detail, so as to avoid smoothing of detailed regions of those frames. In alternative implementations, the quantization step size threshold can be established at other quantization step sizes, such as for use with other video encoding standard, or to achieve a desired degree of aggressiveness/caution in resizing the video resolution.

On the other hand at action 515, if the modeled result is larger than the threshold defined by the video texture, the MBR engine instead uses the relation between encoded size and resolution (GraphRS) to find a modeled result resolution (R') that yields the encoded size corresponding to the target bit rate of the video stream.

The MBR engine further uses the GOP average horizontal and vertical texture measurements to control how much to resize the video resolution in each direction. The MBR engine calculates a ratio of the GOP horizontal and vertical texture measurements. Once it is determined to resize the resolution (action 514), the MBR engine calculates a particular resize amount according to the GraphRS relation. For example, the MBR engine may determine to resize by half the initial resolution. The MBR engine then determines how to distribute the resize amount in the vertical and horizontal directions based on the ratio of GOP horizontal and vertical texture measurement. In particular, if there is a large discrepancy or delta between horizontal and vertical texture measurements (i.e., the ratio is non-unity), the MBR engine distributes the resizing to apply more resizing in the lower detail direction than is applied to the higher detail direction. For example, when the ratio is two, then the MBR engine would resize in the vertical direction twice as much as the horizontal direction. Otherwise, if the delta between the horizontal and vertical texture measurements for the GOP is low (the ratio is near unity), then the MBR engine resizes the resolution equally between the directions.

The MBR engine at action 516 then uses the relations between quantization step size and encoded size (GraphQ$_p$S) and between resolution and encoded size (Graph RS) as well as the target bit rate of the respective video stream to establish a relation (GraphQ$_p$R shown at top left of FIG. 4) between resolution and quantization step size for the particular target bit rate.

At action 517, the MBR engine then uses the relation (GraphQ$_p$R) established in action 516 to find a modeled result of the quantization step size (Q$_p$') for the modeled result resolution R' decided at action 515. The MBR engine then decides to encode this GOP of this video stream at the modeled result quantization step size and resolution (R', Q$_p$').

By use of this dynamic resolution approach, the MBR encoding system is able to assign a larger encoding resolution to less complex video segments (or GOP), which maintains more visual detail. On the other hand, more complex video segments (or GOP) are assigned a smaller resolution that reduces visual artifacts. This approach has been found to provide a better visual experience for multiple bit rate streaming.

V. Representative Computing Environment

Figure 6:
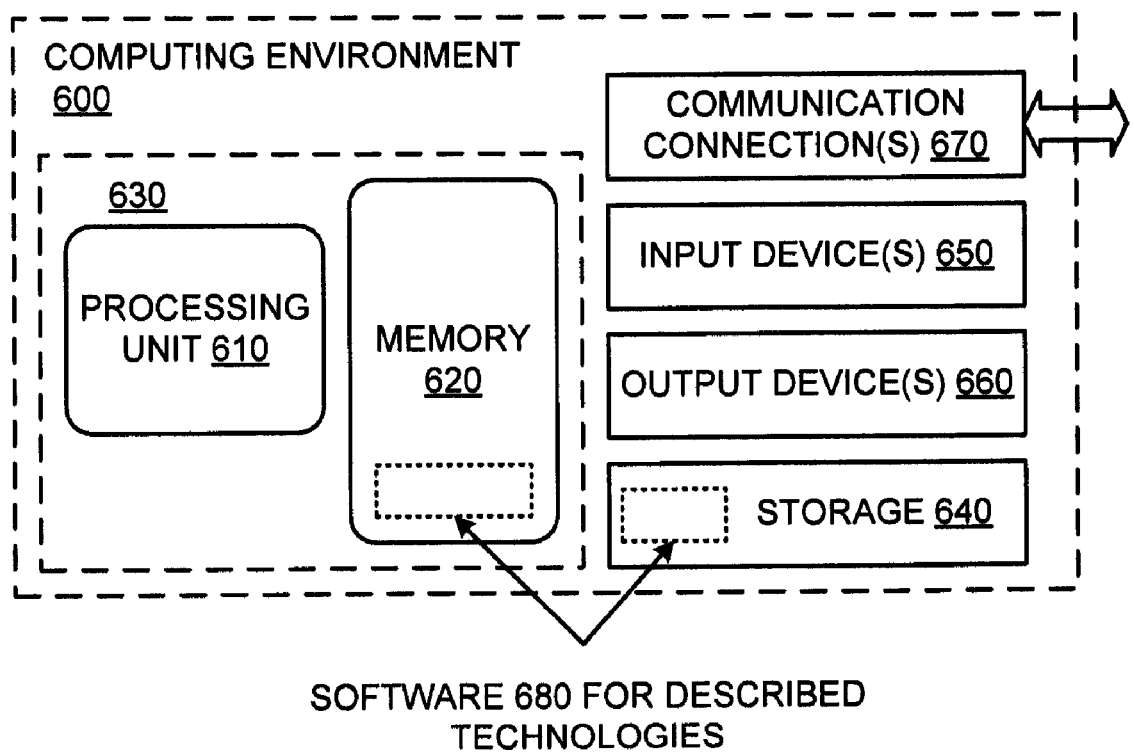
FIG. 6 is a block diagram of a generalized operating environment in conjunction with which various described embodiments may be implemented.

FIG. 6 illustrates a generalized example of a suitable computing environment 600 in which described embodiments, techniques, and technologies may be implemented. The computing environment 600 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 600 includes at least one central processing unit 610 and memory 620. For the multi core motion information precalculation discussed above, the computer includes a multi core CPU having plural CPU cores. In FIG. 6, this most basic configuration 630 is included within a dashed line. The central processing unit 610 executes computer-executable instructions and may be a real or a virtual processor. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment may have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which can be used to store information and which can be accessed within the computing environment 600. The storage 640 stores instructions for the software 680, which can implement technologies described herein.

The input device(s) 650 may be a touch input device, such as a keyboard, keypad, mouse, pen, or trackball, a voice input device, a scanning device, or another device, that provides input to the computing environment 600. For audio, the input device(s) 650 may be a sound card or similar device that accepts audio input in analog or digital form, or a CD-ROM reader that provides audio samples to the computing environment 600. The output device(s) 660 may be a display, printer, speaker, CD-writer, or another device that provides output from the computing environment 600.

The communication connection(s) 670 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 600. By way of example, and not limitation, with the computing environment 600, computer-readable media include memory 620, storage 640, the communication medium, and combinations of any of the above. As should be readily understood, the term computer-readable storage media includes the media for data storage such as memory 620 and storage 640, and not simply transmission media such as modulated data signals.

Any of the methods described herein can be performed via one or more computer-readable media (e.g., storage or other tangible media) comprising (e.g., having or storing) computer-executable instructions for performing (e.g., causing a computing device, audio and/or video processing device, or computer to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of processing input video for variable bit rate encoding of segmented compressed video streams for multi bit rate video streaming, the method comprising:
    receiving input of raw video content to be encoded for multi bit rate video streaming;
    encoding the raw video content in segments comprising groups of pictures as a plurality of compressed video streams ranging in video quality from a top video stream to a bottom video stream, wherein said encoding comprises:
    for the top video stream, encoding the raw video content at a variable bit rate subject to peak bit rate and average bit rate constraints;
    for the bottom video stream, encoding the raw video content at a constant chunk rate, wherein the constant chunk rate is a constant number of pictures per unit time; and
    producing an encoded set of the video streams segmented into the groups of pictures;
    said encoding the raw video content further comprises, for one or more intermediate video streams, encoding the raw video content at a variable bit rate, wherein the peak bit rate and average bit rate constraints of the top video stream and intermediate video streams decrease progressively.

2. The method of claim 1 wherein said encoding the top video stream comprises encoding with a variable bit rate approach targeting a designated average bit rate and constrained to remain under a peak bit rate.

3. The method of claim 1 further comprising:
    receiving input designating maximum and minimum bit rates, as well as a number of compressed video streams to be encoded for multi bit rate video streaming;
    selecting peak bit rate and average bit rate for the top video stream and intermediate video streams to progressively decrease.

4. The method of claim 3 wherein said selecting peak bit rate and average bit rate comprises selecting the peak and average bit rates according to a uniform distribution.

5. The method of claim 3 wherein said selecting peak bit rate and average bit rate comprises selecting the peak and average bit rates according to a logarithmic distribution.

6. The method of claim 3 wherein said selecting peak bit rate and average bit rate comprises selecting the peak and average bit rates to decrease proportionally from top to bottom video streams.

7. The method of claim 1 further comprising:
    selectively streaming the segments of the encoded video streams over a network to a client video playing device, wherein the streamed segments are selected from among the encoded video streams according to client-side rate control decisions based on network conditions.

8. A method of processing input video for dynamic resolution encoding of segmented compressed video streams for multi bit rate video streaming, the method comprising:
    receiving input of raw video content to be encoded for multi bit rate video streaming;
    encoding the raw video content in segments comprising groups of pictures as a plurality of compressed video streams ranging in video quality from a top video stream to a bottom video stream, wherein said encoding comprises:
    for a group of pictures of a video stream to be encoded, obtaining at least three encoding samples for varying resolution and quantization step size;
    establishing a model relating resolution, quantization step size and resulting encoded size for the group of pictures;
    performing a texture measurement on the group of pictures;
    determining a quantization threshold for resizing resolution based on the texture measurement;
    dynamically deciding a video resolution and quantization step size for encoding the group of pictures based on the model and quantization threshold for resizing; and
    encoding the group of pictures with the dynamically decided video resolution and quantization step size.

9. The method of claim 8 further comprises:
    detecting scene changes in the raw video content; and
    wherein said dynamically deciding video resolution comprises applying dynamic video resolution changes at scene change boundaries between groups of pictures.

10. The method of claim 8 wherein said establishing the model comprises:
    establishing a linear model for a relation of quantization step size to encoded size for a given video resolution based on at least two out of the at least three encoding samples of the group of pictures where the encoded size is sampled at the given video resolution and varying quantization step size.

11. The method of claim 10 wherein said dynamically deciding the video resolution comprises:
    determining a quantization step size that yields an encoded size corresponding to a desired bit rate for the group of pictures when encoding at the given video resolution according to the established linear model relating quantization step size to encoded size for the given video resolution;

comparing the determined quantization step size to the quantization threshold for resizing resolution;

if the comparison is not indicative of resizing resolution, deciding to encode the group of pictures using the given video resolution and determined quantization step size; and otherwise, deciding to resize the video resolution for encoding the group of pictures.

12. The method of claim 11 wherein said establishing the model further comprises:

establishing a linear model for a relation of video resolution to encoded size for a given quantization step size based on at least two out of the at least three encoding samples of the group of pictures where the encoded size is sampled at the given quantization step size and varying video resolution.

13. The method of claim 12 wherein said dynamically deciding the video resolution comprises:

in the case where the video resolution for encoding the group of pictures is to be resized, determining a resized video resolution that yields an encoded size corresponding to a desired bit rate for the group of pictures according to the established linear model relating video resolution to encoded size for the given quantization step size.

14. The method of claim 13 wherein, in the case where the video resolution for encoding the group of pictures is to be resized, said dynamically deciding the quantization step size comprises:

establishing a linear model relating quantization step size to resolution at the desired bit rate for the group of pictures based on the at least three encoding samples; and deciding the quantization step size for the resized video resolution according to the linear model relating quantization step size to resolution.

15. The method of claim 8 further comprising:

selectively streaming the segments of the encoded video streams over a network to a client video playing device, wherein the streamed segments are selected from among the encoded video streams according to client-side rate control decisions based on network conditions.

16. A video processing system for encoding compressed video streams for multiple bit rate video streaming, the system comprising:

a memory for storing raw video content to be encoded;

a computer processing means for encoding the raw video content using a variable bit rate and dynamic resolution approach in segments comprising groups of pictures as a plurality of compressed video streams, wherein said encoding by the computer processing means comprises:

analyzing the raw video content to determine scene change boundaries in the video content, divide the video content between said scene change boundaries in the segments comprising groups of pictures, and determine a measurement of video complexity of the segments;

dynamically deciding encoding parameters for variable bit rate encoding of the raw video content of each segment into one or more higher video streams each having a target average bit rate and a peak bit rate constraint that yield a progression of decreasing coded bit rates of the video streams, and for encoding the raw video content of each segment into a bottom video stream at a constant chunk rate, wherein the encoding parameters comprise at least video resolution; and encoding the higher and bottom video streams using the dynamically decided encoding parameters.

17. The video processing system of claim 16 wherein said dynamically deciding the video resolution for a video stream segment by the computer processing means comprises:

obtaining at least three samples of encoding a segment for varying resolution and quantization step size;

establishing a model of a relation between quantization step size, video resolution and encoded size; and deciding the video resolution for the segment based on the established model and measurement of video complexity of the segment.

18. The video processing system of claim 17 wherein said dynamically deciding the video resolution by the computer processing means comprises applying decisions to resize video resolution of the segments at scene change boundaries.

19. The video processing system of claim 16 further comprising said computer processing means automatically selecting the peak bit rate and average bit rate for the upper video streams to have a desired numeric distribution between designated maximum and minimum bit rates for a designated number of the video streams.

* * * * *